United States Patent [11] 3,615,483

[72] Inventors Hendrik Jonker; Casper Johannes Gerardus Ferdinand Janssen; Lambertus Postma, all of Emmasingel, Eindhoven, Netherlands

[21] Appl. No. 623,568
[22] Filed Mar. 16, 1967
[45] Patented Oct. 26, 1971
[73] Assignee U.S. Philips Corporation New York, N.Y.
[32] Priority Mar. 19, 1966
[33] Netherlands
[31] 6,603,640

[54] METHOD OF PHOTOGRAPHICALLY PRODUCING COPPER METAL IMAGES
2 Claims, No Drawings

[52] U.S. Cl. .......... 96/49, 96/36.2, 96/38.4, 96/48
[51] Int. Cl. .......... G03c 5/34, G03c 1/62, G03c 1/56
[50] Field of Search .......... 96/48 PD, 49, 75, 48, 36.2, 38.4

[56] References Cited

UNITED STATES PATENTS

| | | | |
|---|---|---|---|
| 2,066,918 | 1/1937 | Von Poser et al. | 96/91 X |
| 3,929,709 | 3/1960 | Jonker et al. | 96/49 |
| 2,067,690 | 1/1937 | Alink et al. | 96/91 X |
| 2,183,447 | 12/1939 | Dippel et al. | 96/49 |
| 2,738,272 | 3/1956 | Alink et al. | 96/48 X |
| 2,854,386 | 9/1958 | Lyman et al. | 96/36.2 X |
| 3,011,920 | 12/1961 | Shipley | 96/36.2 UX |
| 3,075,856 | 1/1963 | Lukes | 96/36.2 UX |
| 3,006,819 | 10/1961 | Wilson et al. | 96/36.2 X |
| 3,130,052 | 4/1964 | Dippel et al. | 96/49 |
| 3,223,525 | 12/1965 | Jonker et al. | 96/49 X |
| 3,390,988 | 7/1968 | Dippel et al. | 96/48 |

FOREIGN PATENTS

| | | | |
|---|---|---|---|
| 285,447 | 3/1965 | Australia | 96/48 |

*Primary Examiner*—Norman G. Torchin
*Assistant Examiner*—Charles L. Bowers, Jr.
*Attorney*—Frank R. Trifari

ABSTRACT: Selectively expose a diazosulfonate treated film, to obtain free sulfite, treat exposed layer with silver salt to form silver sulfite, reduce the silver sulfite to form a silver nuclei image and treat silver nuclei image with a solution of a copper metal such as nickel, cobalt or silver salt and a reducing agent therefore to form a metal image formed of said metal.

METHOD OF PHOTOGRAPHICALLY PRODUCING COPPER METAL IMAGES

The invention relates to a method of photographically producing metal images which are electrically conducting or are not electrically conducting on and/or in substrates, in which a diazosulfonate is used as a photosensitive compound, and to products obtained by means of this method.

According to a known method, a substrate is photosensitized by means of a solution containing diazosulfonate. Under the influence of light the diazosulfonate is split into a sulfite ion and a diazonium ion. Because the sulfite ion forms a very sparingly dissociated complex compound with the mercurous ions, it is capable of shifting the diaproportioning equilibrium of mercurous ions to the right according to $$Hg_2^{++} \leftrightarrows Hg^{++}+Hg$$

In this manner a latent mercury or silver-amalgam nuclei image is obtained on or in a substrate by exposing the photosensitized substrate behind a negative or a template and then contacting the substrate with a solution which contains a mercurous salt and, if required, a silver salt. In addition to diazosulfonate, the photosensitive layer preferably contains in addition a so-called antiregression agent, for example, cadmium lactate, which is a compound which prevents diazosulfonate from being reformed from its light-reaction product by binding either the sulfite, or the diazonium salt, or both in such manner that the sulfite maintains the possibility of reacting with the mercurous salt while forming mercury nuclei.

The diazosulfonate may be provided in a hydrophilic substrate or in a hydrophilic surface layer on a substrate which is otherwise nonhydrophilic by soaking with a solution of the diazosulfonate. Substrates which cannot be impregnated with water, at least at the surface, however, may alternatively be used as a support layer for the photosensitive compound by providing it as a vitreous layer by means of a predominantly aqueous solution which contains at least the photosensitive compound, if required a wetting agent and/or one or more other compounds which inhibit the drying up of the solution in a crystalline form, which solution is dried up.

The latent mercury or silver-amalgam nuclei image which is obtained after exposure and treatment in the bath which contains mercurous ions and, if desired, silver ions, is then selectively intensified in mass with metal to form an internal metal image or, if the exposure, the introduction of nuclei and the metallic intensification is adapted to each other in a suitable manner to form external, electrically conductive metal images.

The first possibility is the physical development which consists in contacting the nuclei image with an aqueous solution which contains noble metal ions, a photographic reduction agent suitable for these ions and, if desired, a suitable ionic surface-active compound as a development stabilizer. The most commonly used physical developers contain silver ions and, as a reducing agent, for example, p-methylamino-phenol-sulfate, hydroquinone, p-phenylene-diamene or the ferrous-ferric-redoxsystem. Gold, platinum and palladium developers are also known.

Another possibility is to intensify the nuclei image to an image which consists predominantly of copper, nickel and/or cobalt. For this purpose the mercury or silver-amalgam nuclei image must first be activated and then be contacted with a solution of a copper salt, a nickel salt and/or a cobalt salt and a reducing agent for that salt under conditions which result in a selective deposition. The object of this activation is to make the nuclei image catalytic for the deposition of the said metals. For the deposition of copper on the nuclei image a short-lasting physical development with silver is sufficient; for the deposition of nickel and/or cobalt on the nuclei image it is possible either to deposit, by a short-lasting physical development, a thin silver layer which again must be contacted with a dilute solution of a palladium salt and/or a platinum salt, or to deposit immediately a layer of one of these metals by physical development with a palladium or platinum developer.

In order that the rate of deposition of the copper metal, nickel metal and/or cobalt metal be sufficient for practical use, this catalytically acting metal layer must have a thickness of the order of approximately 1,000 A. For many electrotechnical uses, in particular in the field of printed wiring, the presence of such quantities of silver is prohibitive because silver migrates particularly smoothly and thus can produce all kinds of undesired effects. This drawback does not hold good for Pd or Pt, it is true, but these metals are too costly for large-scale application.

Another drawback of the known method is the fact that mercury salts are used. This requires special measures with a view to the toxicity of these salts which are necessary in particular in manufacturing external images, because a comparatively high mercury salt concentration is used.

The invention provides an entirely novel method of obtaining the nuclei and also producing a quite new nature of the nuclei in which all the above drawbacks are absent.

The method according to the invention is characterized in that the light-reaction product which is produced from diazosulfonate by exposure and contains sulfite ions is first converted into a silver sulfite nuclei image by adding silver salt to the solution with which the substrate is photosensitized or by treating the silver-salt-free layer, after the exposure, with a solution of a silver salt and that the silver sulfite nuclei image is then reduced to a silver nuclei image.

It is to be noted that photosensitive systems are also known which use other classes of photosensitive compounds of which the light-reaction product formed by exposure to light is capable of reducing silver ions to metal. So with these systems also a nuclei image consisting of silver can be obtained. However, such a silver nuclei image cannot be directly intensified to an image which predominantly consists of copper or, after activation, of nickel or cobalt but a slight physical development with silver is always necessary prior to the intensification with one of the above-mentioned metals. Apparently, the silver nuclei image obtained by means of the method according to the invention has such a favorable formation that it is able to catalyze without any preintensification with silver the deposition of copper from a copper-plating solution or, after a simple activation with palladium or platinum, can cause nickel or cobalt to deposit selectively from nickel or cobalt plating solutions.

The silver sulfite nuclei can be obtained after exposing the photosensitive substrate to light by contacting said substrate with a solution of a silver salt. With a view to the sensitivity and the quality of the resulting images this variation is to be preferred over the other method in which silver ions are provided simultaneously with the photosensitive compound, by means of a solution, in the substrate or on a nonhydrophilic substrate in a vitreous layer. This variation is to be preferred in particular when external images can be manufactured. Silver ions may be provided simultaneously with the photosensitive compound by dissolving in the soaking solution (sensitizing solution) a separate silver salt in addition to the photosensitive diazosulfonate, or the silver salt of the diazosulfonic acid in question may be used for this purpose. However, the silver salts of most of the diazosulfonic acids are rather poorly soluble.

The exposure energy which is required to obtain an active nuclei image depends upon the sensitizing solution used and upon the fact whether the silver ions are already present in the layer before the exposure or are introduced only later by means of a separate solution. The correct exposure energy for obtaining the desired final result, however, can easily be determined in each actual case by means of a series of test strips If the introduction of the silver nuclei takes place by means of a separate solution, an optimum duration of treatment should be taken into account which depends upon the concentration of the silver salt in the solution, which concentration, however, must at any rate be between 0.02 and 2 mol/l. The duration of treatment varies between approximately 1 minute for the solution having the highest degree of dilution and 2 seconds for the most concentrated solution.

The above treatment in which the resulting silver sulfite nuclei are reduced to silver metal nuclei may be carried out by means of a separate solution. However, this treatment is preferably combined with the subsequent intensification with the image metal because the reducing agent present in the intensification bath usually is also capable of first reducing the silver sulfite nuclei.

There are various possibilities of obtaining the ultimate metal image.

First of all a copper image can be obtained by means of a concentrated strongly alkaline bath, for example, a bath which contains approximately 0.1–0.15 mol/l. of $CuSO_4 \cdot 5\ H_2O$, 0.25–0.30 mol/l, of sodium-ethylene diamine tetraacetic acid and 50–60 g./l, of formalin. With this bath a silver sulfite nuclei image may be intensified directly without preceding reduction or activation to a copper image which is electrically conductive or is not electrically conductive. Drawbacks of this bath are that the deposition of copper in said bath is not very regular, that easily fogging and image spreading occurs and that the lifetime of the bath is rather short. The first two drawbacks can be reduced satisfactorily by treating the silver sulfite nuclei image, before it is contacted with the copper-plating solution, with a concentrated hydrochloric acid solution of approximately 0.2–0.5 mol/l. As a result of this the silver sulfite nuclei image is converted into a silver chloride nuclei image which can be intensified perfectly with the above-mentioned copper-plating bath to form a copper image, reduction from AgCl to silver taking place simultaneously in the same bath. In the course of the investigation which resulted in the invention it was found that alkali chlorides show this effect to a considerably lesser extent, while other anions which likewise contain less-soluble silver salts, for example, bromide, iodide, chromate, cyanide or ferrocyanide, show no effect at all or substantially no effect.

In addition a number of copper-plating baths are known which have lower concentrations and consequently are more stable. When these baths are used activation as a rule is necessary, preferably with a dilute solution of a palladium salt or a platinum salt. It is sometimes efficacious to perform said activation prior to the reduction of the silver sulfite nuclei while in other cases the best result is obtained by activating the metallic silver nuclei.

Baths are known for chemically nickel-plating or cobalt-plating in which hypophosfite is used as a reducing agent. When these baths are used, the silver sulfite nuclei are used, the silver sulfite nuclei are first reduced, for example, with an alkaline formalin solution and then activated, for example, with a dilute solution of a palladium salt or a platinum salt. Nickel-plating or cobalt-plating solutions may alternatively be used in which borohydride compounds or borazanes are used as reducing agents.

Of course, all known physical silver developers may alternatively be used to obtain silver images. As compared with the known methods, the method according to the invention of manufacturing silver images, as mentioned above, has the advantage that the poisonous mercury salts can be avoided during the process.

EXAMPLE I

A cellulose triacetate foil saponified to a depth of 2 microns was photosensitized by soaking it for 2 minutes with a solution in water which contained per liter 0.1 mol of sodium salt of o-chloro-p-methyl-benzenediazosulfonic acid, 0.1 mol of citric acid and 0.1 mol of silver nitrate. A strip of this foil was then exposed behind a template to the light of a high-pressure mercury lamp of 125 watt (type HPR) for 90 minutes at a distance of 30 cms. The strip was subsequently rinsed in deionized water for 15 seconds, after which the intensification of the silver sulfite nuclei image was carried out by means of a chemical copper-plating solution in water which contained per liter, 0.14 mol of copper sulfate, 5 aq. 0.30 mol of tetrasodium salt of ethylene diamine tetraacetic acid, 0.65 mol of sodium hydroxide and 160 mls. of 35 percent formaldehyde solution. The duration of action was 10 minutes at a temperature of 20° C. A neutral-grey internal image was obtained which consisted of finely-dispersed copper.

A strip containing a similar nuclei image which had been treated with this copper-plating solution for 20 minutes showed an external electrically conductive image which had the outward appearance of copper metal.

Similar results may be obtained if instead of the photosensitized superficially saponified cellulose triacetate foil a photosensitive superficially anodized aluminum foil is used.

EXAMPLE II

A film of polyethyleneterephthalate, thickness 75 microns, was provided with a layer of glue, 10 microns thick, by pouring a 15 percent solution of polyester resin 49,002 of du Pont de Nemours in 1,1,2-trichloroethane to which per 40 g. of glue solution 1 g. of hardener RC-805 (Du Pont de Nemours) had been added. After drying at room temperature for 24 hours a photosensitive layer was provided on the resulting layer of glue by suffusing it with a solution in water which contained per liter: 0.05 mol of magnesium salt of o-methoxy benzenediazosulfonic acid 0.0167 mol of lactic acid, 0.0167 mol of cadmium lactate, 0.0167 mol of calcium lactate and 10 g. of "Lissapol N," a nonionic surface-active substance which consists of a condensation product of alkyl phenols with ethylene oxide. After the excess of photosensitive solution has drained off and drying up of the remaining layer, the layer was exposed behind the negative of a wiring pattern to the light of a 125 watt HPR lamp for 1 minute at a distance of 30 CMS. The silver sulfite nuclei image was formed by keeping the film immersed for 15 seconds in a 0.5 mol silver nitrate solution in water. The film was then thoroughly rinsed in deionized water for 15 seconds after which the intensification of the nuclei image was effected by electroplating for 5 minutes with the copper-plating solution of example I. The resulting electrically conducting copper pattern was further intensified with copper by electrodeposition until the desired thickness had been reached by means of a bath containing 1.5 N $CuSO_4 \cdot 5H_2O$ and 1.5 N $H_2SO_4$. A flexible printed wiring pattern was obtained having an excellent adhesion of the copper pattern to the material of the substrate. Comparable results can be obtained by using, instead of the polyester glue, a type of glue on the basis of a butadiene acrylonitrile copolymer which also contains an alkaline phenol or cresol resin, for example, the glue N 178 which is marketed by Armstrong Cork Company, or the glue 200 TF of Shipley.

Corresponding results can also be obtained by coating, instead of the polyethylene terephthalate film, a polyimide film ("Kapton" film of du Pont de Nemours) with the above-mentioned polyester glue and then subjecting it to the treatments described above.

If nonflexible printed wiring is to be manufactured, the above prescription may be applied as such to substrates of hard paper or epoxy glass (glass fiber embedded in epoxy resin).

EXAMPLE III

A film of polyethylene terephthalate, thickness 75 microns, was provided with a layer of glue, approximately 1 micron thick, by pouring a polyester glue solution obtained by diluting the solution described in example II in the ratio 1:9 with dichloroethane. After drying and providing a photosensitive layer according to example II, the film was exposed with an HPR lamp behind a negative of a cross frame with transparent lines, width 5 microns, distance between the lines 30 microns. The further treatment was quite analogous to that described in the preceding example on the understanding that the copper-plating by electrodeposition was continued until the metal frame had a thickness of approximately 5 microns. The film with the metal frame was finally dipped in methylene chloride as a result of which the frame could be separated from the substrate. The resulting frame was destined for being mounted in a television camera tube. For metal patterns which can be detached from the substrate material without difficulty a glue on the basis of polyvinyl acetate polyvinyl alcohol, for example, the glue "Vinylite" Ma 28 -18 of Union Carbide, may alternatively be advantageously used. A suitable concentration of the glue solution is obtained when 15 g. of MA 28-18 are diluted with a mixture of methanol and ethanol to 100 mls. The separation between the metal pattern and the substrate material can be effected by dipping the film with the pattern in ethanol, methanol or acetone.

EXAMPLE IV

Two strips of a polyethylene terephthalate film ("Mylar" film of du Pont de Nemours) was provided with a layer of polyester glue in the manner described in example II. A photosensitive layer was provided on one strip by suffusing with a solution in water which contained per liter: 0.05 mol of magnesium salt of o-methoxy-benzenediazosulphonic acid, 0.0167 mol of lactic acid, 0.0167 mol of cadmium lactate, 0.0167 mol of calcium lactate, 0.04 mol of silver nitrate and 10 g. of "Lissapol N."

The photosensitive layer on the other strip was provided with a 0.05 molar aqueous solution of the silver salt of o-chloro-p-methyl-benzene diazosulfonic acid which contained in addition 10 g. of Lissapol N. per liter.

The exposure of the photosensitive strips and the intensification of the silver sulfite nuclei images was carried out in the manner as described in example II.

EXAMPLE V

Two foils of polyethylene terephthalate film, thickness 12.5 microns, were provided, in one of the manners already described, with a thin polyester glue layer and photosensitized in the manner as described in example II. The foils were exposed for 1 minute behind a negative of a line frame with lines having a width of 150 microns by means of a 125 watt HPR lamp. After the exposure the foils were successively treated with a silver nitrate solution and rinsed with deionized water as described in example II. One foil (A) was then kept immersed for 15 seconds in a 0.2 molar solution of hydrochloric acid, the other (B) was kept immersed for the same period of time in a 0.1 molar solution of hydrochloric acid which contained in addition 0.2 g. of palladium chloride ($PdCl_2$) per liter. The two foils were then rinsed for 15 seconds in deionized water and intensified with copper.

Foil A was intensified for 5 minutes in the copper-plating solution of example I, foil B was intensified for 15 minutes in a solution in water which contained per liter: 0.015 mol of copper sulfate 5 aq, 0.0003 mol of ethylene diamine tetraacetic acid, 0.09 mol of potassium-sodium-tartrate, 0.042 mol of sodium carbonate, 0.15 mol of sodium hydroxide and 35 mls. of 35 percent formaldehyde sòlution. The resulting screening frames were finally intensified by electrodeposition by means of the copper-plating bath of example II to a thickness of approximately 2 microns.

As a result of the additional treatment with hydrochloric acid and with palladium chloride-hydrochloric acid, respectively, an improved definition of the line patron was obtained.

EXAMPLE VI

A silver sulfite nuclei image of a printed wiring pattern obtained as described in example II was immersed for a few seconds, after thoroughly rinsing in deionized water, in an aqueous solution which contained per liter 0.65 mol of sodium hydroxide and 160 mls. of 35 percent formaldehyde solution as a result of which a silver nuclei image was formed. After thoroughly rinsing the latter in deionized water it was intensified for 40 seconds by means of a stabilized physical developer containing per liter: 0.2 mol of ferrous ammonium sulfate, 0.8 mol of ferric-nitrate, 0.1 mol of citric acid, 0.1 mol of silver nitrate, 0.2 g. of "Armac 12 D,"0.2 g. of "Lissapol N."'"Armac 12 D" principally consists of dodecylamine acetate in addition to acetates of amines of lower and higher fatty acids.

The resulting conductive silver patterns were finally intensified with approximately 20 microns of copper by electrodeposition on a flexible substrate.

EXAMPLE VII

Silver nuclei images on polyester film which are obtained by reduction of silver sulfite nuclei images in a manner as described in the preceding example were activated by treating for 15 seconds with a 0.1 molar solution by hydrochloric acid in water which contained in addition 0.2 g. of palladium chloride per liter. After thoroughly rinsing the resulting nuclei images for 15 seconds with deionized water they were intensified to the desired thickness of electrodeposition with baths of the following compositions:

A. 30 g. of nickel chloride ($NiCl_2 \cdot 6H_2O$)
10 g. of sodium hypophosphite ($NaH_2PO_2 \cdot H_2O$)
10.5 g. of citric acid and
5.6 g. of sodium hydroxide
Solvent: water to 1 liter; pH=4.6.

B.
30 g. of cobaltous chloride ($CoCl_2 \cdot 6H_2O$)
10 g. of sodium hypophosphite
20 g. of citric acid
10 g. of sodium citrate
Solvent: water to 1 liter, pH adjusted to 9 to 10 by means of ammonia. The activation treatment may alternatively be used advantageously for manufacturing printed wiring on hard paper and epoxy glass, respectively, when the intensification by electroless plating preceding the intensification by electroplating is to be carried out with certain copper-plating solutions which are commercially available, for example, the solution of Sel-Rex.

What is claimed is:

1. A method of photographically providing metal images formed of copper, on a substrate, said method comprising the steps, treating a substrate with a diazosulfonate having the moiety $-N{=}N{-}SO_3$ to thereby photosensitize said substrate, exposing selected portions of said thus photosensitized substrate to actinic light, treating said selectively exposed substrate with an aqueous solution consisting essentially of a silver salt thereby forming silver sulfite nuclei images at the exposed areas of said substrate and then treating said substrate with an aqueous solution of a salt of copper, and a reducing agent capable of reducing to silver the silver sulfite and reducing to copper the salt of copper, thereby forming a visible photographic image formed of copper at the exposed areas of said substrate.

2. The method of claim 1 wherein the silver sulfite nuclei images are treated with a concentrated hydrochloric acid solution prior to treatment with the aqueous solution of the copper salt.